United States Patent
Ostergaard et al.

(10) Patent No.: US 8,229,286 B2
(45) Date of Patent: Jul. 24, 2012

(54) METHOD AND SYSTEM FOR FILE FAST-FORWARDING AND REWIND

(75) Inventors: Christian Ostergaard, Vaerlose (DK); Jesper Majland, Greve (DK)

(73) Assignee: Nokia Corporation, Espoo (FI)

( * ) Notice: Subject to any disclaimer, the term of this patent is extended or adjusted under 35 U.S.C. 154(b) by 1132 days.

(21) Appl. No.: 11/690,287

(22) Filed: Mar. 23, 2007

(65) Prior Publication Data

US 2008/0235583 A1    Sep. 25, 2008

(51) Int. Cl.
*H04N 5/783* (2006.01)

(52) U.S. Cl. .................... 386/343; 386/345

(58) Field of Classification Search .......... 386/343, 386/347, 345, 350, 344

See application file for complete search history.

(56) References Cited

U.S. PATENT DOCUMENTS

| | | |
|---|---|---|
| 2002/0009020 A1 | 1/2002 | Nozaki |
| 2007/0101264 A1 | 5/2007 | Abanami et al. |
| 2008/0148327 A1* | 6/2008 | Xu .................. 725/105 |

FOREIGN PATENT DOCUMENTS

| | | |
|---|---|---|
| EP | 1 367 588 A2 | 12/2003 |
| EP | 1 626 408 A1 | 2/2006 |
| JP | 2005-099107 A | 4/2005 |
| JP | 2006-196052 A | 7/2006 |
| WO | WO 00/59214 A1 | 10/2000 |
| WO | WO 03/088238 A1 | 10/2003 |
| WO | WO 2006/137229 A1 | 12/2006 |

OTHER PUBLICATIONS

International Search Report and Written Opinion for Application No. PCT/IB2008/000682 dated Sep. 2, 2008.

* cited by examiner

*Primary Examiner* — Robert Chevalier
(74) *Attorney, Agent, or Firm* — Alston & Bird LLP

(57) ABSTRACT

A method of scrolling or fast-forwarding/rewind includes enabling a fast forwarding/rewind mode of a device to review a file, activating an input device to change a fast forwarding/rewind speed at a first rate, and activating the input device at least one subsequent time to change the fast forwarding/rewind speed at a second rate that is different from the first.

32 Claims, 14 Drawing Sheets

METHOD AND SYSTEM FOR FILE FAST-FORWARDING AND REWIND

BACKGROUND

1. Field

The disclosed embodiments generally relate to the handling of content in a device, and in particular to reviewing and scrolling content such as media application content and text based application content.

2. Brief Description of Related Developments

Devices, such as for example, portable computers, media players, mobile communication devices and mobile phones, are commonly used to listen to and view different types of media files and content. In some cases it is desirable to advance through portions of a media file at a faster rate than the normal rate of review. This can generally be referred to as fast forwarding or rewind. While these features are generally available with respect to media content files, the speed at which such fast forwarding or rewind tends to be at a fixed level. This can be a hindrance when reviewing larger file sizes due to the length of time needed to proceed through portions of the file to get to a desired point. With smaller files, it can be difficult to control the precision in advancing or rewinding through the file. It would be advantageous to be able to control the speed of fast forwarding and rewind through media files and content, whether on a media player, mobile communication or some other device.

DVD players can have a chapter-skipping feature. The fast forward speed can also be increased from 1× to 2×, 4×, 8× and so on. This feature can be used for very fast forwarding. The Apple™ iPod™ has a feature that allows a faster forward review or skip speed. When scrolling the wheel on the device continuously for 1-2 seconds, a pop-up letter occurs and instead of scrolling all artists in a list, the user now scrolls by the first letter of the artist's name. While these features provide a forwarding and scrolling function, the forwarding/scrolling functions are linear and do not reflect the size or duration of the content that needs to be forwarded/scrolled. It would be advantageous to provide a more efficient way to scroll content, that takes into consideration the size and duration of the content.

SUMMARY

In one aspect, the disclosed embodiments are directed to a method of file playback. In one embodiment, the method includes enabling a fast forwarding/rewind mode of a device to review a file, activating an input device to change a fast forwarding/rewind speed at a first rate, and activating the input device at least one subsequent time to change the fast forwarding/rewind speed at a second rate that is different from the first.

In another aspect, the disclosed embodiments are directed to an apparatus for file playback and review. In one embodiment, the apparatus includes a content handling device, a user interface coupled to the content handling device, and a processor in the content handling device configured to change a fast-forwarding/rewind speed to a first rate upon activation of an input device of the apparatus, change the fast-forwarding/rewind speed to at least one other rate upon at least one subsequent activation of the input device, the at least one other rate being different from the first.

In a further aspect, the disclosed embodiments are directed to a computer program product. In one embodiment the computer program product includes a computer useable medium having computer readable code means embodied therein for causing a computer to execute a set of instructions in a device to enable an adaptive fast forwarding/rewind mode of a device. The computer readable code means in the computer program product can include computer readable program code means for causing a computer to receive a request to change a speed of a fast forwarding/rewind mode, computer readable program code means for causing a computer to determine a remaining duration of a file to be skipped, computer readable program code means for causing a computer to apply a speed adaptation function to the remaining duration of the file to be skipped, and computer readable program code means for causing a computer to determine a speed to be applied to the fast-forwarding/rewind mode based on the remaining duration of the file and the speed adaptation function.

In yet another aspect, the disclosed embodiments are directed to a user interface. In one embodiment the user interface comprises an area configured to display a file duration, an area configured to display a speed adaptation function; and an area configured to display a position of a current file view.

BRIEF DESCRIPTION OF THE DRAWINGS

The foregoing aspects and other features of the embodiments are explained in the following description, taken in connection with the accompanying drawings, wherein.

DETAILED DESCRIPTION OF THE EMBODIMENT(s)

Figure 1:
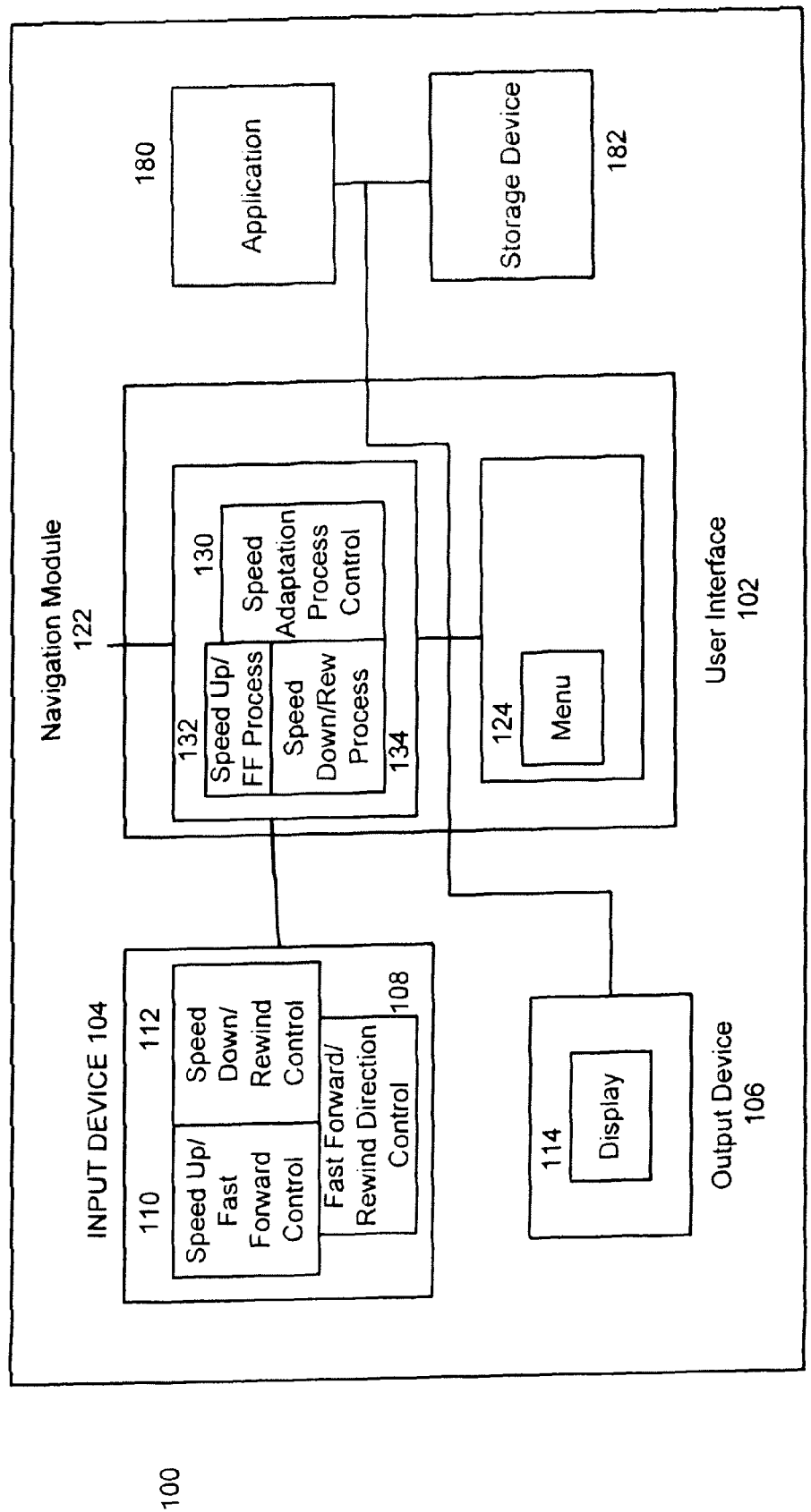
FIG. 1 shows a block diagram of a system in which aspects of the disclosed embodiments may be applied.

Referring to FIG. 1, one embodiment of a system 100 is illustrated that can be used to practice aspects of the claimed invention. Although aspects of the claimed invention will be described with reference to the embodiments shown in the drawings and described below, it should be understood that these aspects could be embodied in many alternate forms of embodiments. In addition, any suitable size, shape or type of elements or materials could be used.

The disclosed embodiments generally allow a user of a device or system, such as the system 100 shown in FIG. 1 to increase or decrease a scrolling speed, such as fast-forwarding/rewind speed, during review or playback of a file or other such content, such as for example, a media content file. The term "media content" as used herein generally refers to all content that can be reviewed or played back, and can include for example, without limitation, audio, video, images (e.g. slide shows) and recorded voice messages. While media files are generally referred to herein, the disclosed embodiments are not so limited and may encompass any content or application that can benefit from adaptive behavior when scrolling text-based or media content. These applications can include for example, browsers, such as mobile and Internet based browsers, text editing applications or data applications. The system shown in FIG. 1 can generally encompass any system or device that can be used to scroll, forward, rewind or play back content, such as media content. Such devices can include, but are not limited to, personal computers, media players, DVD players, CD players, portable music players, MP3 players, PDA's and mobile communication devices.

The system 100 of FIG. 1 generally includes a user interface 102, input device 104, output device 106, application area 180 and storage device 182. The components described herein are merely exemplary and are not intended to encompass all components that can be included in a system 100. While the user interface 102, input device 104 and output device 106 are shown as separate devices, in one embodiment, the input device 104 and output device 106 can be part of, and form, the user interface 102.

The input device 104 receives inputs and commands from a user and passes the inputs to the navigation module 122 for processing. The output device 106 can receive data from the user interface 102, application 180 and storage device 182 for output to the user. Each of the input device 104 and output device 106 are configured to receive data or signals in any format, configure the data or signals to a format compatible with the application or device 100, and then output the configured data or signals. While a display 114 is shown as part of the output device 106, in other embodiments, the output device 106 could also include other components and device that transmit or present information to a user, including for example audio devices and tactile devices.

The input device 104 enables a user to provide instructions and commands to the device 100. In one embodiment, the input device 104 includes a fast-forward (navi-up or speed-up) control 110, rewind (back navi-down, or speed-down) control 112 and directional control 108 for providing user input and for navigating between menu items. In alternate embodiments, the user input device 104 can include any number of suitable input controls, data entry functions and controls for the various functions of the device 100. The fast-forward control 110 and rewind control 112 generally allow the user to select and manipulate the fast-forward and rewind functions of the device, with respect to the playback or fast playback of content, such as text based or media based content. In one embodiment, the fast-forward control 110 and rewind control 112 can take the form of a key or keys that are part of the user interface 102. Other control forms can include, for example, joystick controls, touch screen inputs and voice commands.

In one embodiment, the direction control 108 of FIG. 1 can be used to select a fast-forward or rewind function of a content scroll or playback mode of the device 100, while the controls 110, 112 can be configured to provide an increase in speed or a decrease in speed of the scrolling or playback. The term "playback" as used herein is generally intended to encompass all review type functions, including scrolling, scanning, skipping, searching, forward and rewind functions. In alternate embodiments, the controls of the input device 104 can be configured in any suitable manner. In one embodiment, a dedicated direction control is not required to invoke the fast-forward/rewind functions. Also, the control devices 108, 110 and 112 can also be hard keys or soft keys, depending upon the application or device.

The user interface 102 can also include a menu system 120 and navigation module 122. The menu system 120 can provide for the selection of different tools and application options related to the applications or programs running on the device 100. The navigation module 122 provides for the control of certain processes of the device 100. In the embodiments disclosed herein, the navigation module 122 receives certain inputs, such as for example, signals, transmissions, instructions or commands related to the fast-forward/rewind playback functions of the device 100. Depending on the inputs, the navigation module interprets the commands and directs the fast-forward process control 132 or rewind process control 134 accordingly.

The speed adaptation process control 130 of the navigation module 122 can be used to determine how much to increase, decrease or adjust the fast-forward/rewind speed based on the inputs to the input device 104 together with other pre-determined constraints and rules. In one embodiment, the speed adaptation process control 130 can receive user inputs from the fast-forward control 110 or rewind control 112, apply the inputs to a speed adaptation algorithm or curve, such as those shown in FIGS. 2A-2E, and provide a corresponding speed control input to either of the fast-forward (speed-up) process control 132 or rewind (speed-down) process control 134. The process controls 132, 134 are merely exemplary and can be combined into a single speed process control, device or mechanism if desired.

When a fast-forwarding/rewind feature of the device 100 is enabled, the users can manually or automatically control the fast-forwarding and rewind speed for reviewing or playback of a file. For example, when a fast-forward option is enabled on the device 100, the user can activate the input device 104 and send a speed adjustment signal such as an increase or decrease fast-forward speed command to the navigation module 122. In one embodiment, control 110 can be used to increase the speed, while control 112 might be used to decrease the speed. In alternate embodiments, the controls 110 and 112 can comprise a single control where the direction of the speed adjustment is dependent upon the position or positioning of the control mechanism. Activating a control generally includes any suitable manner of selecting or activating a function associated with the device, including touching, pressing or moving the input device. In one embodiment, where the input device 104 comprises a device having a keypad, pressing a key can activate a function. Alternatively, where the input device 104 includes a multifunction rocker style switch, the switch can be used to select a menu item and/or one of the controls 110, 112 can be used to select or activate a function. Voice commands and other touch sensitive input devices can also be used.

The disclosed embodiments generally provide for an adaptive fast-forwarding/rewind speed control that can be continuous or discrete. When the fast-forward/rewind direction control 108 or mode of the device 100 is enabled, in one embodiment, the user can activate the speed-up control 110 or speed-down control 112 to adjust the fast-forward/rewind speed. The use of multiple input devices or keys to control and adjust the speed is not required. In one embodiment, a single input device can be used to control the fast-forward/rewind speed. The step increase or decrease in speed can be based at least in part on the user input and the speed adaptation curve, such as those shown in FIGS. 2A-2E. In one embodiment, the number of and types of user inputs can be used as a basis to determine and set the fast-forward/rewind speed. For example, in one embodiment, an initial user input to control 110 initiates forward scrolling. Subsequent user inputs to the control 110 can increase the forward scrolling speed. Each input to the control 110 can be detected and passed to the speed adaptation process control 130 where a determination is made, based upon a selected speed adaptation curve, as to the step or change in speed to be applied. The change can include for example, an increase in speed, decrease in speed or stop in the process. Similarly, if the rewind control 112 is activated or active, subsequent user inputs to the control 112 can be detected and passed to the speed adaptation process control 130, where the speed can similarly be adjusted.

The forward scroll or fast-forward/rewind speed could also be adaptive of or responsive to where in the file the current playback view is. This will allow the speed to increase to a higher level when there is a great deal of content to go through, and to slow down when reaching the end of a file. Additionally, the fast-forwarding/rewind function can be adjusted when certain marks or flags within the file are reached. For example, in the case of a DVD movie file, the forwarding speed could automatically slow when approaching a new chapter, and then increase again until the next chapter is reached. The user interface 102 of the device 100 of FIG. 1 could include a suitable display 114 that indicates when these points, chapters, are reached. The user interface 102 might provide the user with the opportunity to slow, stop or continue as each point is approached or reached.

In one embodiment, the scrolling speed/adjustment can be based on or determined by a number of files to be reviewed, scrolled or skipped. For example, a user is listening to a music album. The user wishes to find a specific song and needs to scroll through any number of files or song to locate or reach the desired song. The adaptive speed control described herein can be applied to scrolling for fast-forwarding through the next or previous songs, until the desired song is reached. While this example is made with respect to music or song files, the disclosed embodiments can be applied to other suitable types of data or information files. The aspects of the disclosed embodiments can be used to scroll or skip content other than just the current content of the active application. Unopened or stored files can also be scrolled in an adaptive manner.

In another embodiment, the adaptive scrolling described herein can be dependent upon the behaviorism of other users scrolling the same content. For example, in one embodiment, the system 100 can have knowledge related to other user's behavior with respect to the same content. A server or application 180 in the system can be configured to collect, extract or receive scrolling data and history related to the desired content. Such information can be available or made available for sharing across the web.

The user interface 102 might also provide a visual indicator or other que to advise the user as to how far into the file the fast-forward/rewind has progressed, and the current location within the file. Chapters and other demarcation points could be marked with a graphical indicator, such as a flag, that can be detected and visualized, even at a high speed. The graphical indicator can include any suitable indicator, such as for example, a progress bar or wheel, reference numbers or other task bar.

In one embodiment, the navigation module 122 of FIG. 1 can be configured to allow the user to automatically jump to a point in time that is at a point prior to the input to stop the fast-forwarding/rewind. In some situations, particularly when manual user input is used to stop the scrolling process, there can be a time delay from the point to where a change is desired to the actual manual input and scroll speed change. Thus, it is advantageous to be able to automatically back-up to a point that is close in time to the actual or desired demarcation point. The fast-forward/rewind could then continue from this prior point at a different speed, such as a slower speed, until a stop point or other speed change demarcation point is reached. The point can be any demarcation point or unit in the file, such as for example, a frame, a flag or other such event type. In one embodiment, the selected point can be based on an actual time or duration of the file, or in terms of a percentage or default value. For example, this point might be a point in time based on the scrolling speed at the time the flag or demarcation point is passed. An increase, decrease or stop forwarding/rewind feature can be configured so that after a suitable command is received, review resumes at a point in the file that is, for example 1-3 seconds just prior to the command is received. The timing and resumption point can be determined based on the scroll speed that was in effect at the time of the command. In alternate embodiments, any suitable time period can be used. In one embodiment the navigation module 122 of the user interface 102 of FIG. 1 can include an automatic or user configurable feature that allows the user to set the jump back to point. This can be advantageous since it allows the user to set any desired point as the jump back to point.

Figure 2A:
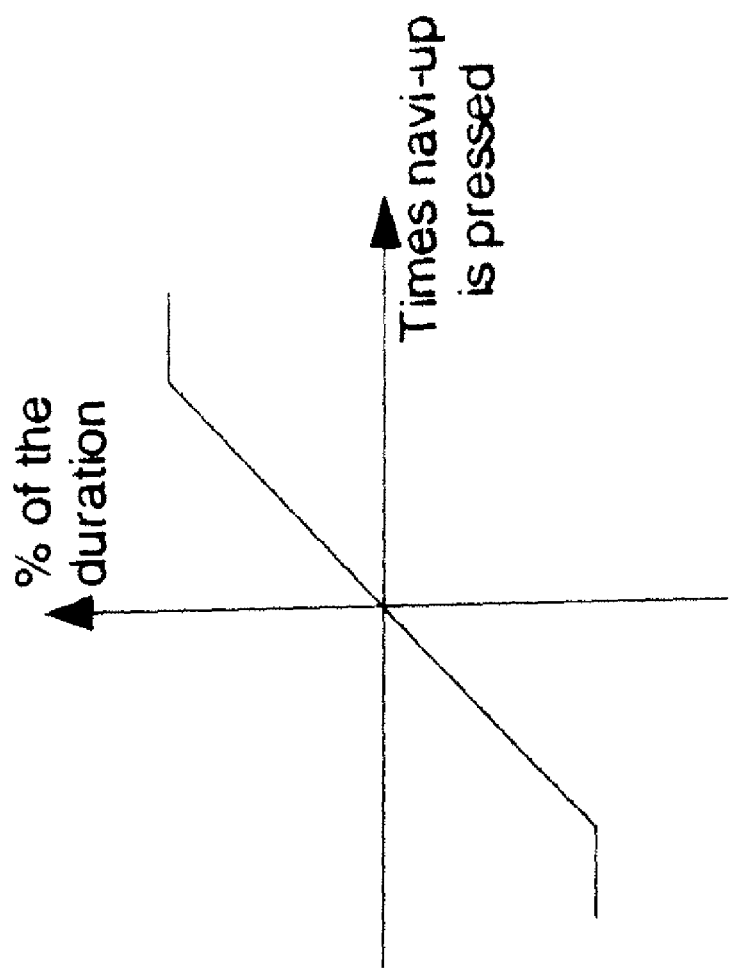
FIGS. 2A-2E are exemplary graphs illustrating speed adaptation functions of the disclosed embodiments.
Figure 2B:
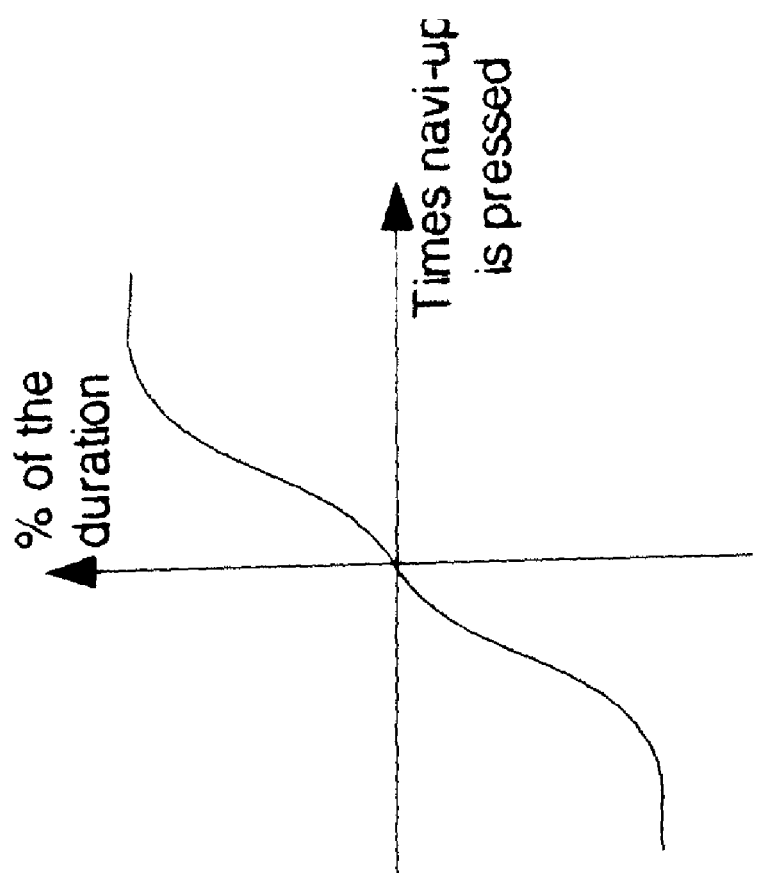

FIGS. 2A-2E are illustrative of various embodiments of speed adaptation curves that can be utilized by the speed adaptation process control 130 to make adjustments in the fast-forward/rewind speeds. In FIGS. 2A and 2B, the fast-forward/rewind speed is shown as a function of the percentage of the duration of the file length and a number of times the fast-forward/rewind function key (shown as "navi-up") is pressed. The "navi-up" key could be a single input to the device 100, or as shown in FIG. 1, a combination of controls, such as controls 108, 110 and 112. Although FIGS. 2A and 2B are described in terms of the "number" of times the key is pressed, in alternate embodiments the pressing could be a function of the length of time the key is pressed or a time interval between presses. As shown in FIGS. 2A and 2B, the fast-forward/rewind speed increases each time the fast-forward/rewind function key is pressed. When the percentage of the duration of the file reaches a pre-determined level, the fast-forward/rewind speed reaches a maximum level.

In an embodiment where the user input device 104 comprises a keypad, various key press sequences can be used to enable and/or control the changes in the fast-forward/rewind speed. Some of the key press sequences can include, for example:
  (A) press and holding the fast-forward control 110 can cause an increase in speed. Upon release of the key:
    (i) maintain speed; or
    (ii) stop.
  If (A)(i), fast forwarding can be stopped by:
    (a) a dedicated stop key, such as control 108; or
    (b) a press on the fast-forward control 110; or
    (c) a press on the rewind control 112.
  (B) the fast forwarding key 110 is pressed more than one time, where each press causes an increase in speed in accordance with the speed adaptation curve.
  (C) the fast forwarding key 110 is pressed and an automatic change or increase in the speed is initiated.
    (i) another press on the fast forward key 110 will cause:
      (1) stop; or
      (2) maintain fast forward speed.
    in the case of (C)(i)(2):
      (a) a stop key can be used to stop fast forwarding; or
      (b) fast forwarding can be stopped by pressing the fast forward key 110 or the rewind key 112.

The above-described sequences are not intended to be limiting and are merely examples of some possible key activation sequences. In one embodiment, the manner of pressing the key can be used to select the desired functionality. For example, a short duration press of the key can activate one function, while a longer duration press of the key can activate another. Additionally, the time duration or interval between presses can also activate different functions. For example, in the situation where repeated presses of the fast forward key causes an increase in speed, the increase might only occur if the time duration between presses is short. If a longer time interval or duration between presses is detected, another function might be activated, such as for example a reduction in fast forward speed or a stop.

With reference to FIGS. 2A-2E, in one embodiment, the fast forwarding/rewind speed can be based on the total length or duration of the file. By using the duration, or percentage of the duration of the file length as a factor in determining the fast-forward/rewind speed, the length of time for fast-forward/rewind through a small duration file will be substantially the same as the length of time need for fast-forward/rewind through a larger or longer duration file.

A determination is made of the total duration of the file. The speed with which fast-forwarding/rewind is carried out is then based on the duration of the file combined with the adaptive speed increase function to determine the duration of the file to be skipped each time unit. The speed increase function can be adaptive in shape based on the duration of the file.

Referring to FIG. 2A, in another embodiment, a default increase in the fast forward/rewind speed is initially based on the total length or duration of the file or files. Thus, the longer the duration of the file, the faster the initial review speed will be set to. The user can then adjust the review speed by activating or pressing the user input corresponding to the speed control on the device. For example, once the fast-forwarding/rewind feature is enabled, the control 110 is assigned as the fast-forward/rewind speed control. A first press can initiate the default review speed. Subsequent presses can increase the speed by a pre-determined amount, as shown for example, in the speed control function of FIG. 2A. Each time the control 110 is pressed, more of the file is skipped each time unit.

In one embodiment, the scrolling may also be in achieved in burst rates where each activation or press, for example a short duration press, causes a jump or skip of a certain percentage of the content or file. The burst or advances can be of any desired or suitable length, and can be preset or user configured.

In an embodiment where there is a separate control 110, 112 for each of the fast-forward and rewind functions, an initial selection of one key can establish the scroll or fast review direction. A subsequent press of the key will increase the fast review speed, while a press of the other key can slow the fast review speed. For example, as shown in FIG. 1, control 110 corresponds to the fast-forward function, while control 112 corresponds to the rewind function. A first selection or press of control 110 establishes the initial fast review direction and speed. A subsequent press of the fast-forward control 110 will increase the fast review speed, while a press of the rewind control 112 will slow the fast review speed. Here again, control 108 can be assigned a stop function, or no function at all, with respect to the fast review process of this embodiment.

The speed adaptation curve of FIG. 2A illustrates a linear increase where the fast-forward/rewind speed increases linearly with respect to the duration of the file length and the number of times the fast-forward/rewind function key is pressed. The speed for fast-forwarding and rewind is generally a function of the percentage of the duration of the file length times duration of the file length. Generally, the speed will not exceed approximately 10% of the duration of the file length. In alternate embodiments, any suitable speed can be set.

FIG. 2B illustrates another embodiment of a speed adaptation curve. This speed adaptation curve is non-linear and in this embodiment, the average fast-forward/rewind speed range that is supported is approximately 30% of the file size, and the maximum fast-forward/rewind range reaches approximately 75% of the duration of the file. Generally, the longer the duration of the audio/video file, the faster the initial review speed will be. The user can then adjust this speed up or down as desired by pressing the appropriate control input. For example, if the "forward" or "up" key is pressed, more of the file is skipped, giving the impression of an increased fast-forward speed. The adaptive acceleration allows a user to begin the fast-forward/rewind slowly, and increase the speed to a maximum speed, as desired. In one embodiment, the fast-forward/rewind speed can be initially set at a high level as shown in FIG. 2B. After a certain period of time, the speed can attain a steady state as shown in FIGS. 2A and 2C, or gradually slow to a slower speed as shown for example in FIGS. 2D and 2E.

Figure 2C:
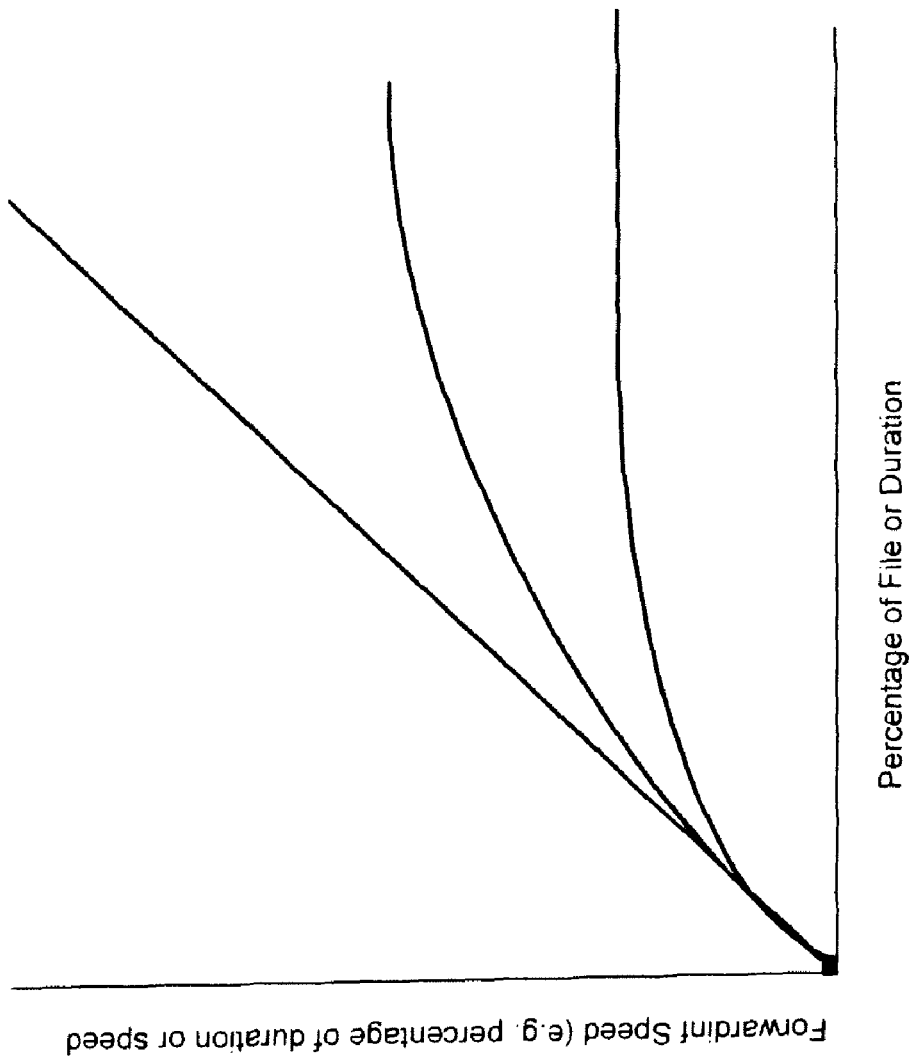
Figure 2D:
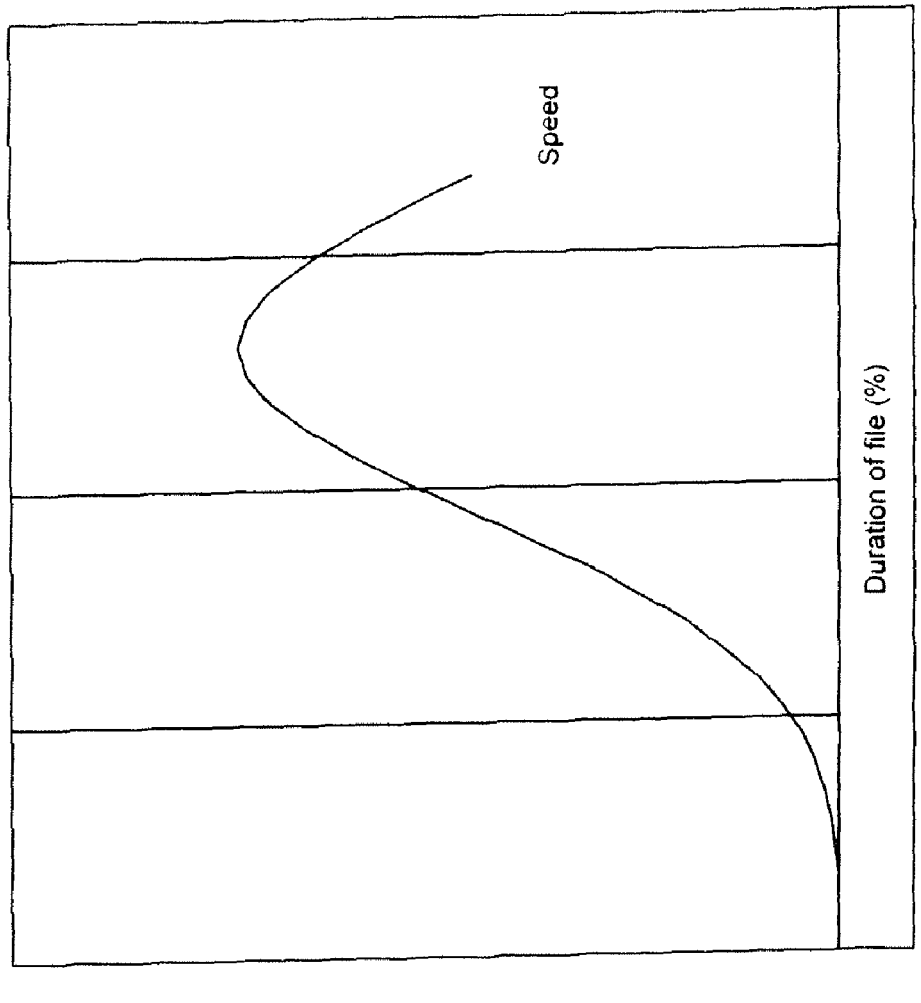
Figure 2E:
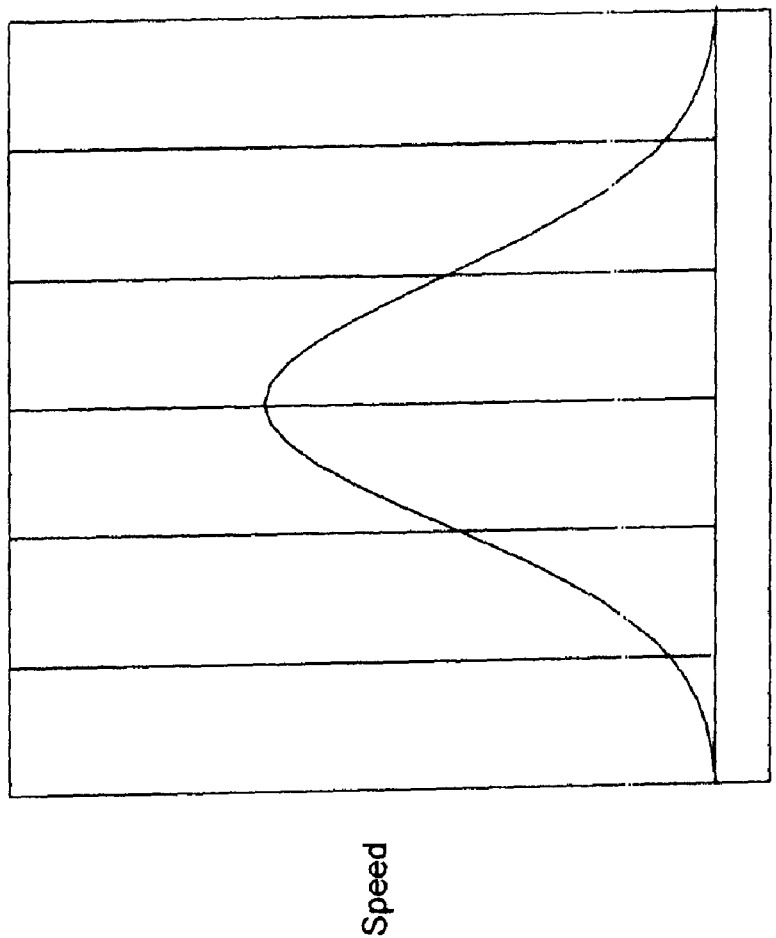

FIG. 2C illustrates additional examples of speed adaptation curves that might be used to provide step increases in the fast-forward/rewind speed. The speed is a function of the forwarding speed (e.g. percentage of the duration or speed) and the percentage of the file or duration. FIGS. 2D and 2E illustrate examples where there is initially a high speed, a period of steady-state or maintained speed, and then a gradual fading to a slower speed. The disclosed embodiments allow the user to choose between one of many speed adaptation curves, which are not limited by the examples provided herein. In one embodiment, the user can define the shape of the speed adaptation curve. The user can set specific points on the curve to adapt it to their needs. The user can also design specialized curves for audio, video, voice recordings and other types of media.

Alternatively, pre-defined steps can be available for selection and application to the speed adaptation curve. For example, a list of pre-defined steps could include setting a speed based on 1%, 2%, 4%, 8% and 10% of the duration of the file. In one embodiment, the menu system 124 of the system 100 of FIG. 1 can be used to access or create speed adaptation curves to be applied. Using the controls of the input device 104, the user can select or create a particular speed adaptation curve and store it in storage device 182 or such other suitable facility, where the curve can be accessed by the speed adaptation process control 132.

In one embodiment, the fast-forward/rewind speed can be manually adjusted. For example, input device 104 of FIG. 1 can comprise a manual speed adjustment device that is used to establish and set the fast-forward/rewind speed. For example, a slide key with a spring and tractive force measurement (gauge) device can be used as the manual speed adjustment control. The slide key can be moved in one direction for fast-forwarding and the opposite direction for rewind. For example, moving the slide key to the right can provide an input to the speed adaptation process control 130 which informs the fast-forward process control 132 to set a corresponding speed, while moving the slide key to the left will cause the speed adaptation process control 130 to provide an input to the rewind process control 134 and set the rewind speed. The tractive force exerted will adjust the speed in the respective direction. When the key is released, the fast-forwarding or rewind will stop. In this embodiment, the speed is maintained by applying a constant tractive force, i.e. holding the slide key in its current position. A tolerance range of movement can be established to account for inadvertent movements of the key or difficulties in holding the key in the same position for any length of time. In alternate embodiments, any suitable device can be used to provide a manual speed control input, other than including a tractive force device. For example, the device could include a multifunction control device, a joystick style navigation control or a touch sensitive plate.

In one embodiment, when the input device 104 is a touch sensitive plate, the duration of the contact can be used to set or adjust the scrolling speed. For example, the user puts a finger to the plate and draws a line by sliding the finger over the touch sensitive plate and holding it on the touch sensitive plate. The length and direction of the line drawn can determine the scrolling direction and speed. Releasing contact with the touch sensitive plate can yield a stop so that the duration of the contact determines the duration of the scrolling. In one embodiment, the touch sensitive screen or plate can also be pressure sensitive and the pressure imparted by the input device 104 on the touch sensitive screen can be varied and used for navigation. For example, more pressure can correspond with a faster speed or increase in speed, while a light pressure corresponds to a reduced speed. In alternate embodiments, the pressure imparted by the input device on the touch pad can be configured to correspond with any desired speed or variation in speed.

The direction of the line can also be used to adjust the scrolling speed. For example, in one embodiment, if a line is drawn from left to right fast forwarding speed is increased; if drawn from right to left fast rewind speed is increased. In alternate embodiments, any suitable direction or curve can be used. For example, scroll adaptation speed curves can be configured on the touch pad screen. Up/down curves, half-circles or other user defined curves can be set using the touch pad device.

Further, orientation of lines and their specific functionality can be language dependent; e.g. middle eastern population might like that lines from right to left increases fast forwarding speed since that is the reading direction. In one embodiment, the touch pad device can be used to input characters, demarcations or other indicia that correspond to review points in a file. For example, when playing a DVD, chapter numbers can be drawn on the touch pad device, to which the review will jump to. Alternatively, the user might input percentage values or rates at which scrolling might occur. In order to facilitate user recognition of the input, the user interface 104 might display the input to the touch pad device or provide some other recognizable output, such as audio. The user might also use the touch pad device to input search criteria. For example, this could include a text form or other suitable indicia.

While a manual manner of stopping fast forwarding/rewind has been described herein, stopping the fast forwarding/rewind sequence could also be based on a pre-determined criterion. For example, the fast forward/rewind sequence could continue to certain points or demarcation points within a file. These points might include, for example, bookmarks, chapters, sections or other marks in the file. A mark or point could include the detection of the lack of content or a blank screen of a certain duration or time period. In alternate embodiments, any suitable or desired criteria can be used to establish a pause or stopping point in a fast forward/rewind sequence. The disclosed embodiments provide an adaptive accelerated speed increase for fast forwarding through files, such as for example audio and video files. By setting a default speed corresponding to a percentage of a total duration or length of the file, the user can then adjust the speed up or down to suit the precision with which to proceed through the file. This can include, for example, the application of a speed adaptation curve, such as those shown in FIGS. 2A-2E. The user can choose between any one of a number of speed adaptation schemes to apply a desired fast-forward/rewind function.

Figure 3A:
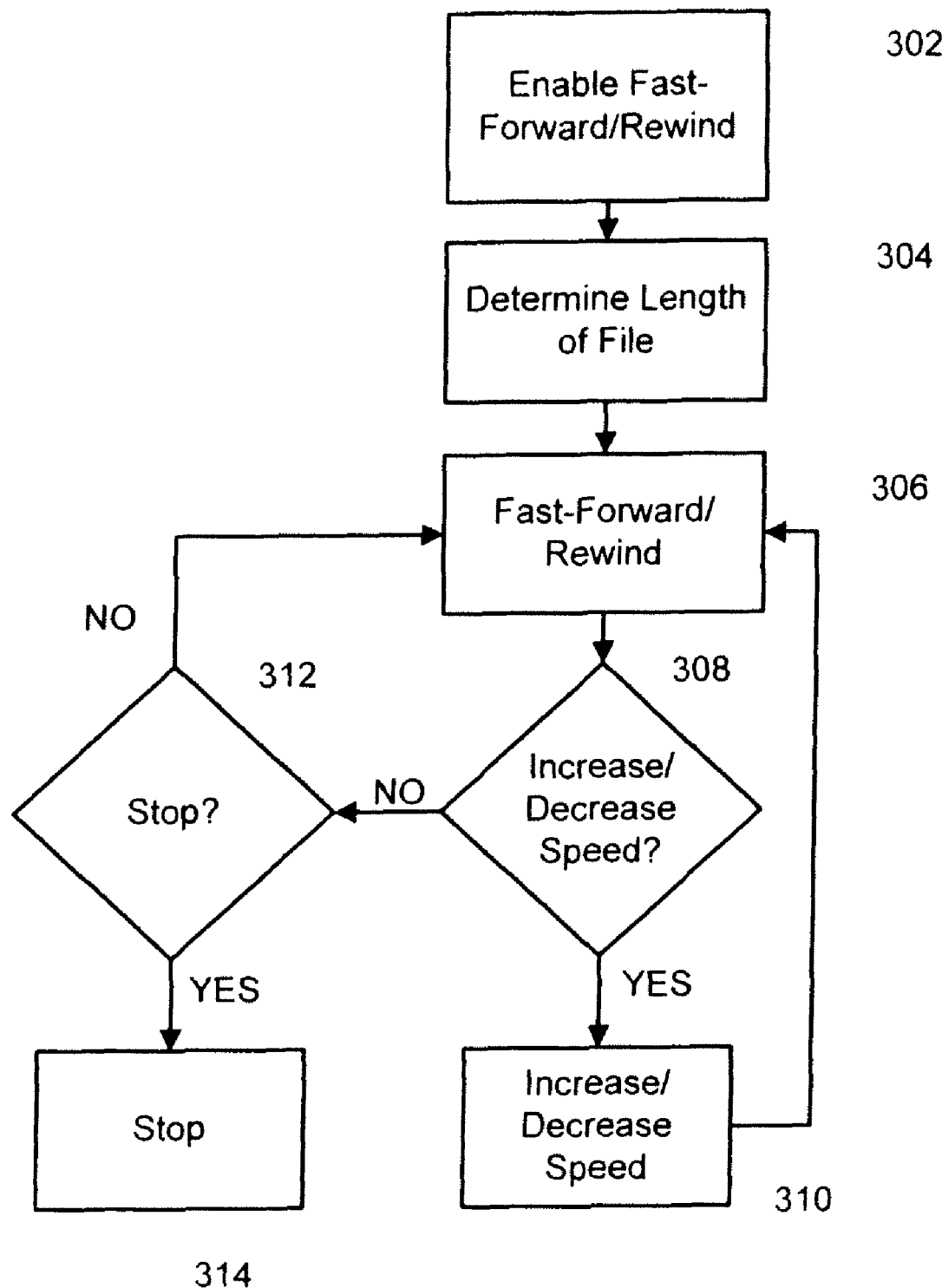
FIGS. 3A-3C are exemplary flow diagrams of embodiments of methods incorporating aspects of the claimed invention.

FIG. 3A illustrates one embodiment of a method of fast-forward/rewind. The user enables 302 a fast-forward/rewind function of a device. Once the fast-forward/rewind function is enabled, a determination 304 is made as to the length of the file. Based on this determination, an initial fast-forward/rewind speed is set 306 and fast-forwarding/rewind begins. The initial speed can be set in conjunction with a speed adaptation algorithm. It is then determined 308, if a request is made to increase or decrease the fast-forward/rewind speed. If yes, then the fast-forward/rewind speed is increased or decreased 310 by a pre-determined amount, in accordance with the speed adaptation algorithm. If no, a determination 312 is made if a stop request is made. If yes, the fast-forwarding/rewind stops 314. If a stop request is not made, the fast-forwarding/rewind continues 306 at the current speed.

Figure 3B:
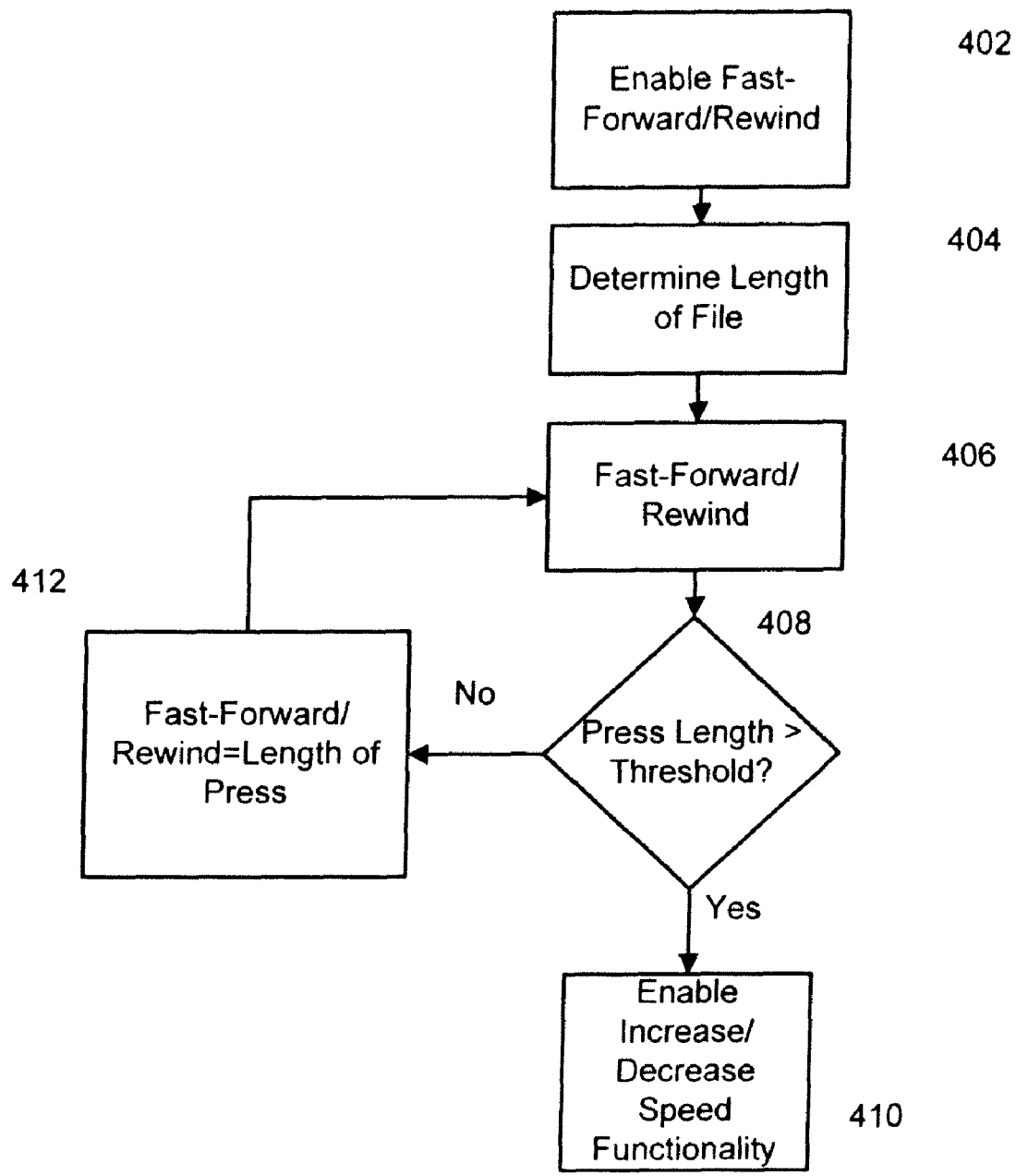

In one embodiment, referring to FIG. 3B, another method incorporating features of the claimed invention is illustrated. In this embodiment, the fast-forward/rewind function or mode is enabled. The length or duration of the file is determined 404 and the initial fast-forward/rewind speed is set 406. It is determined 408 whether the fast-forward/rewind enable key is being pressed and whether the duration of the press exceeds a pre-determined threshold time period. If no, the fast-forwarding/rewind lasts 412 only the length of the key press. However, if the length of the key press exceeds the pre-determined threshold, the fast-forwarding/rewind control referred to with respect to FIG. 3A is enabled 410. The user will now be able to increase and decrease the speed of the fast forwarding/rewind functions using the designated key or keys of the device.

In one embodiment, an indication of when the change in function of the fast-forward/rewind key occurs can be displayed on the user interface. As shown in FIG. 1, the user interface 102 of the device 100, includes or is coupled to an output device 106, which includes display 114. The user interface 102 can, through the display 114, provide the user with an indication of the point in time when the function of the fast-forward/rewind control will change. For example, a graphical indicator can be used to let the user know that a release of the key will stop the fast-forward/rewind. The graphical indicator can be in the form of a timer that informs the user of the remaining time period prior to the function change. If the length of the key press exceeds the pre-determined threshold described with respect to FIG. 4, the user interface 102 can provide the user with an indication that the function of the key is now to increase the fast-forward/rewind speed.

The time interval needed to change the functionality of the fast-forward/rewind key can also be displayed on the display 114 of the user interface 102 of the device 100. For example, in one embodiment, the actual time units remaining could be displayed. In another embodiment, a horizontal or vertical bar could be displayed that either empties or fills to represent the time interval remaining. In alternate embodiments, any suitable indicator can be used to illustrate and represent the time interval and remaining time period for the function change to occur.

The user interface 102 of FIG. 1 can also provide a graphical representation of the fast-forwarding/rewind system of the disclosed embodiments. In one embodiment, the user interface 102 can be configured to provide an indication or representation on a display 114 of the device 100 as to the various states of fast-forwarding/rewind. For example, the display 114 can include a progress bar that indicates the current point in the file, the amount of the file that has been skipped, and the amount of the file that still remains to be skipped. In another embodiment, the display 114 might also include a time reference that represents the time remaining in the fast-forwarding/rewind to reach the desired point. The output device 106 might also include an audible indication. Generally, the user interface 102 can be configured to provide any suitable indicator of the selected function and file content.

Figure 4:
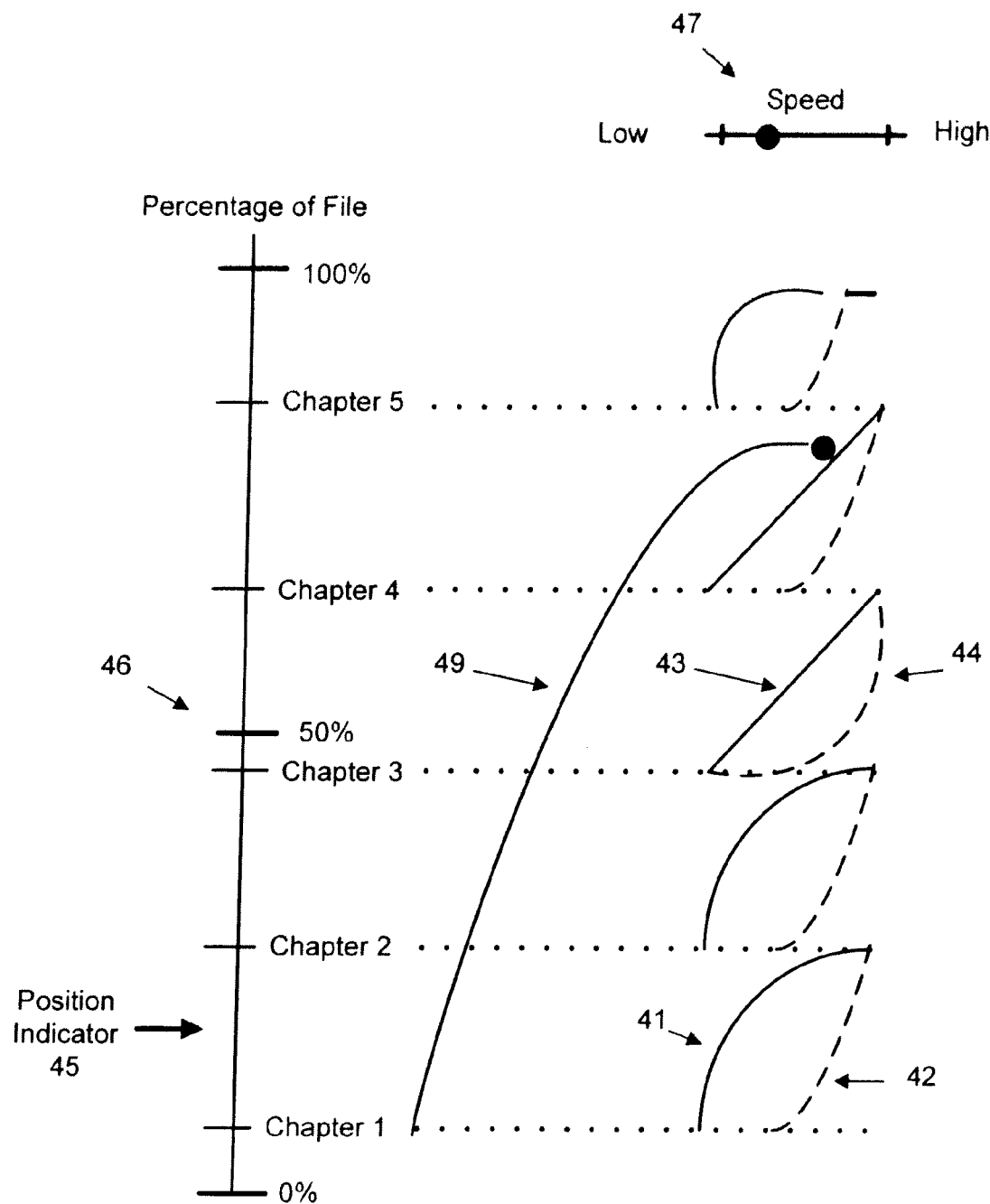
FIG. 4 is an illustration of one embodiment of a user interface incorporating aspects of the claimed invention.

FIG. 4 illustrates an example of a graphical representation of the fast-forwarding/rewind function as it might be shown on the display 114 of the user interface 102 of FIG. 1. In this example, the user is fast-forwarding through a file that is demarcated by chapters, as shown on the vertical scale. The vertical scale generally represents the percentage of the file, starting at 0% near the origin and 100% near the uppermost point. In addition to the chapter demarcations, positions corresponding to the total quantity of the file have also been marked at 0%, 50% and 100%. In alternate embodiments, any suitable demarcation points and indicators can be utilized. In FIG. 4, the reference point 46 corresponds to the midway point in the file, or 50%. A position indicator 45 can also be provided to indicate the current location in the file, or where in the media file the current view is. As the fast-forward/rewind proceeds, the position indicator 45 can also move to correspond to the current location of the playback in the file. Although an arrow style position indicator is shown in FIG. 4, in alternate embodiments any suitable type of graphical or textual indicator can be used to display a current position of a playback point.

In one embodiment, the user interface 102 of FIG. 1 can also be configured to indicate the fast-forward/rewind speed. For example, as shown in FIG. 4, the display can include an indicator bar 47 that indicates the current speed of the fast-forward/rewind mode. While an indicator bar is shown in FIG. 4, any suitable graphical representation of a speed function can be utilized. The user interface can also display the particular speed adaptation function that is being used in conjunction with the fast-forwarding/rewind mode. As shown in FIG. 4, a speed adaptation function or curve, such as curves 41-44, is displayed in conjunction with the fast-forward/rewind progress between each chapter. Each curve 41-44 can represent the desired speed adaptation function selected and applied for proceeding through each chapter. As shown in FIG. 4, each of curves 41-44 represent different functions that can be applied. Although different functions are shown, in one embodiment, the speed adaptation curve can be the same or constant throughout. Curve 49 represents the application of a single speed adaptation function from a beginning point in Chapter 1 to an end point between Chapter 4 and Chapter 5.

The speed adaptation functions of the disclosed embodiments can be implemented manually or automatically. As noted earlier, different input activation or key presses can effect or activate different scroll speeds or speed adaptation functions. In one embodiment, the speed adaptation functions, such as those shown in FIG. 4, can automatically be implemented and/or executed. For example, scrolling is activated and a speed adaptation curve is selected as the scrolling control. Scroll speed adjustment can take place automatically in accordance with the selected function defined by the speed adaptation curve.

In one embodiment, the user can retain control over scrolling speed by being able to override any automatic change in the scroll speed. When an automatic change in scroll speed occurs, the user can have available the option to overrule the change and return to a previous speed or some other default speed. The override function can be implemented by activating a predetermined key or input of the device. For example, if scrolling is taking place in the forward direction, and speed automatically begins to decrease, for example when an end point or stop point is being reached, the user can activate the key to override the slowdown, and resume the prior scrolling speed.

Although a number of curves are shown in FIG. 4, the actual display on the user interface 102 may only show the speed adaptation function being used at the current time. Furthermore, in alternate embodiments, any one of the graphical indicators can be displayed, in conjunction with, or without the others. These graphical indicators could be indicated on a main area of the output device 106, or on a side bar or pop-up window, for example. Alternatively, where a remote control device having a display is being used to control the fast-forward/rewind, one or more of the indicators could be shown on such a display.

Figure 5:
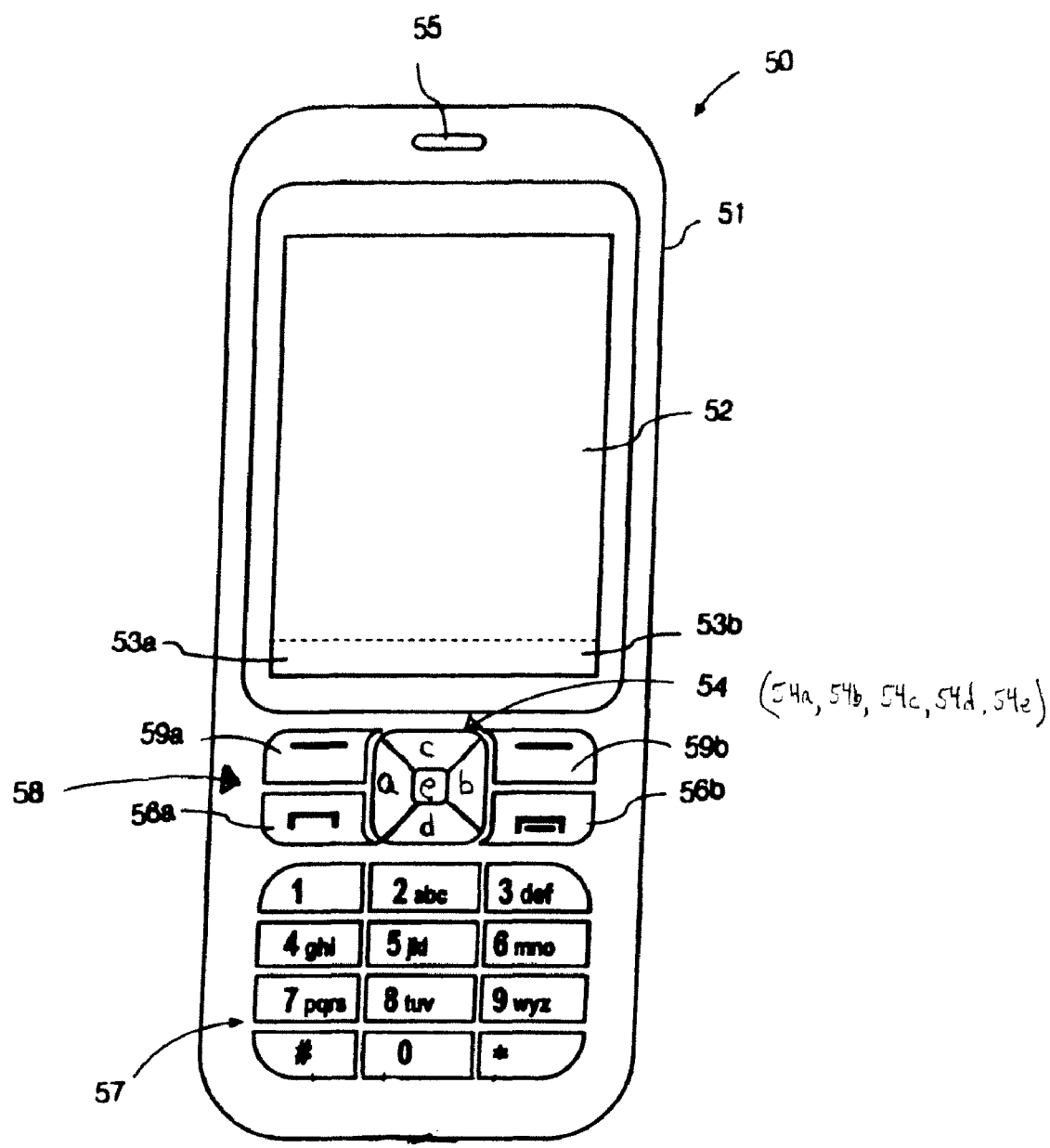
FIG. 5 is one example of a front view of a mobile device incorporating features of the disclosed embodiments.

FIG. 5 illustrates an example of a device 50 that can be used to practice aspects of the disclosed embodiments. The device 50 includes a keypad 57, function keys 56a, 56b, 59a, 59b, and a five-way rocker switch 54. Rocker switch 54 can include peripheral actuators or keys 54a, 54b, 54c, and 54d and central actuator or key 54e. In one embodiment, when a content playback function of the device 50 is activated, one or more of the keys referred to above can be configured for the playback application. For example, screen areas 53a and 53b might be configured to display the function corresponding with keys 59a and 59b, which might correspond to rewind and fast-forward, respectively. Alternatively, multifunction key 54 might be used to navigate the Options menu of the device 50 to select a particular review option. In that case, keys 59a and 59b might be associated with speed-down and speed-up, respectively.

In one embodiment, the fast-forward/rewind mode is enabled, and key 59b is configured to increase the speed while key 59a is configured to decrease the fast-forward speed. It should be noted that while this current example is being illustrated with respect to fast-forwarding, the same concepts apply to the rewind function. When fast-forwarding, the key 59a can be activated or pressed to slow or stop the fast-forward. Although this example illustrates the use of key 59a to slow or stop fast forwarding when that feature is active, in alternate embodiments, any suitable key on the device 50, including key 59b, can be configured to pause or stop the fast forwarding. The increase/decrease in speed can be continuous or discrete. Button 54 can be configured to provide fast-forward, rewind, speed-up/down and the stop function. If key 54 is a multifunction/multipositional device, such as for example a joystick style device, the different sectors of the key 54 can be configured to increase and decrease the fast-forward/rewind speed. For example, key 59c might be enabled to activate fast-forward. A pressing of key 54b can be used to increase speed, while pressing key 54a can decrease the speed. Pressing key 54e can cause fast-forwarding to stop. Similarly, if the user desires to rewind, key 59d can be configured to begin the rewind function, while keys 54a and 54b are configured to provide the increase and decrease in speed. Key 54c might again be used to stop rewinding. Although as described above, another pressing of the key 59a or 59b, might cause the respective function to stop.

In one embodiment, it can be possible to switch from forward scroll to rewind without first changing the speed. For example, if the user is in the fast-forward mode and wishes to review what has been skipped, the user can go back to this content by pressing the rewind key. Rewind can begin immediately, perhaps at a speed that is slower than the forward scroll speed was.

In one embodiment, the display area 52 can be configured to provide suitable indications on the display as to the corresponding function of each key. For example, once a fast-forward/rewind mode of the device 50 is enabled, areas 53a and 53b can be configured to display the functions for fast-forward and rewind assigned to keys 59a and 59b, respectively. This could include displaying the text "Rewind" and "Fast-Forward", or a corresponding image, in each the respective areas. When the user selects the desired function by pressing key 59a or 59b, the display 52 might then show the speed function (speed up or speed down) associated with each key 59a and 59b. For example, if the user selects key 59b to enter the fast-forward mode, key 59b might then be configured to increase the fast-forward speed upon a subsequent pressing. The section 53b of the display 52 could be configured to illustrate such an option to the user. Similarly, in this example, the area 53a of the display 52 can be configured to illustrate that activation of the key 59a will result in a decrease in the fast-forward speed. In this embodiment, the user can easily visualize the respective function corresponding to each key. It will be understood that while these functions have been described with respect to certain keys of the device 50 illustrated in FIG. 1, any suitable keys of the device can be configured to provide the needed functionality.

In one embodiment, the display 52 can be configured to display a file duration bar that will increase or decrease over time depending upon the fast-forward/rewind speed. The duration bar will allow the user to visualize the remaining duration of the file to fast-forward/rewind through to reach the desired or pre-determined point in the file.

Although the above embodiment is shown as being implemented on and with a mobile communication device, it will be understood that the disclosed embodiments can be practiced on any suitable device that is used to play media content. For example, in one embodiment, the input device 104 of device 100 of FIG. 1 can include an external mouse or such other controls. Various keys on the mouse can be configured to provide and activate the fast-forwarding and rewind controls. When a fast-forward/rewind mode is entered, the keys on the mouse can be configured to assume certain functionalities. In an instance where the device includes a trackball or other wheel style selection mechanism, the rotating mechanism can be configured to cause a respective increase or decrease in speed.

In one embodiment, a remote control device can be used to provide the control inputs to the device 100. The remote control device can include suitable keys that provide the user input functionality described above. In one embodiment, the remote control device could include a display. The display could, among other things, display a frame number or reference time that can be used to set and/or monitor the forwarding/rewind progress. Scrolling could be used to set the points to which fast-forwarding/rewind should occur.

As noted earlier, the increase or decrease in speed can be dependent upon the number of times, or the length of time, a respective speed-up or down key is pressed. In some cases it is desirable to advance across large portions of a file, when the file is large. In other cases, when a file is smaller, it might be desirable to advance through the file in smaller steps. The pressing of a key can be used to set a desire resolution for the advances. Another example of providing a variable resolution/precision for a rotator is described in U.S. patent application Ser. No. 10/449036, (NC42084), filed on May 29, 2003, the disclosure of which is incorporated herein by reference in its entirety.

Figure 3C:
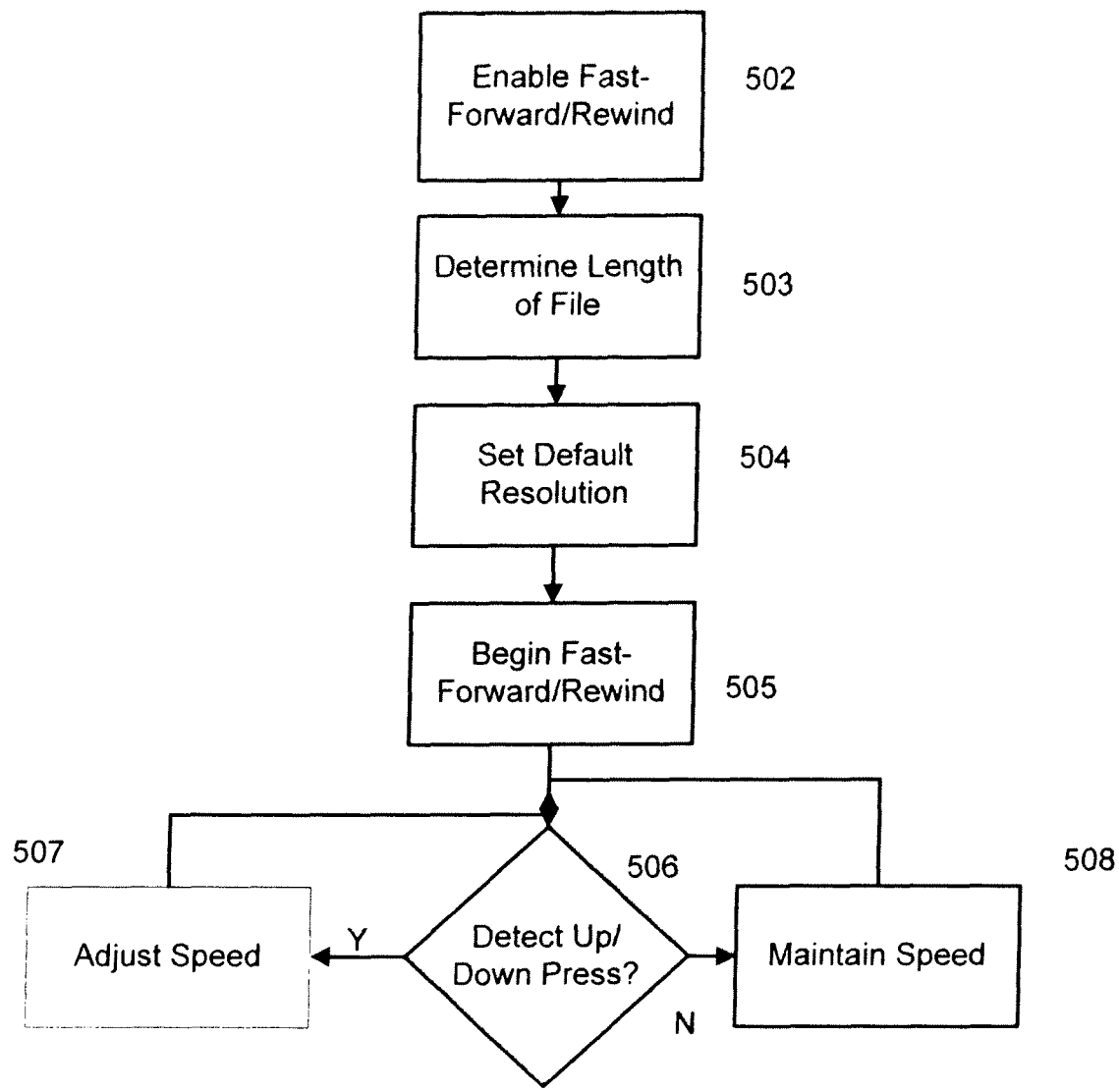

For example, referring to FIG. 3C, initially, when a fast-forward mode is enabled 502, a determination 503 is made of the file length or duration. A default resolution is then set 504 for each advance of the fast-forward (or rewind) speed. A default initial speed is set 505 to begin the fast-forward or rewind. The default resolution and the default initial speed can be set as a function of the duration of the file. For example, the default initial speed can be set at twice the playback speed, or 3% of the total duration of the file. In alternate embodiments, any suitable default initial speed can be established. Each detection 506 of a subsequent press of the increase decrease speed keys will cause a corresponding change in speed, as dictated by the default resolution, which can be variable.

In one embodiment, the number of presses can be detected to set the speed. For example, if the increase speed key is activated a number of times in quick succession, that can indicate a faster speed and lower resolution is to be set. (i.e. larger steps in fast-forward/rewind). If the increase speed key is activated in a slower manner, this slower activation speed could indicate that the corresponding file advance (fast forward or rewind) speed is to be incremented slowly, with a higher resolution. The user might also be able to adjust the default settings.

In one embodiment, the type of input can also be used to select the type of speed adaptation function to be applied to the fast-forwarding/rewind modes. For example, in one mode, a long duration press might be used to select a speed adaptation function that gradually increases in speed, while a short duration press might be used to select or activate a speed adaptation function that rapidly increases in speed. Alternatively, the number of activations, such as key presses, can be used to select and activate a desired speed adaptation function. In one embodiment, in a suitable mode, the various speed adaptation functions available in the device can be displayed on the user interface 102, using for example, menu 124, and the user can use the input device 104 to select a desired speed adaptation function.

The device 100 of FIG. 1 can generally comprise any suitable electronic device, such as for example a personal computer, a personal digital assistant (PDA), a mobile terminal, a mobile communication terminal in the form of a cellular/mobile phone, or a multimedia device or computer. In alternate embodiments, the device 100 of FIG. 1 may be a personal communicator, a mobile phone, a tablet computer, a laptop or desktop computer, a television or television set top box a DVD or High Definition player or any other suitable device capable of containing for example a display 114 shown in FIG. 1, and supported electronics such as the processor 618 and memory 602 of FIG. 6. For description purposes, the embodiments described herein will be with reference to a mobile communications device for exemplary purposes only and it should be understood that the embodiments could be applied equally to any suitable device incorporating a display, processor, memory and supporting software or hardware.

Referring to FIG. 5, in one embodiment, the mobile device 50 generally comprises a user interface having a housing 51, a display 52, an on/off button (not shown), an audio output device 55 (only the opening is shown), and an audio input device (not shown). The mobile device 50 is generally adapted for communication via a cellular network, such as the GSM 900/1800 MHz network. In alternate embodiments, the mobile device is adapted for use on any suitable communication network, such as for example a Code Division Multiple Access (CDMA) network, a 3G network, or a TCP/IP-based network to cover a possible VoIP-network (e.g. via WLAN, WIMAX or similar) or a mix of VOIP and Cellular such as UMA (Universal Mobile Access).

Referring again to FIG. 1, in one embodiment the device 100 has a user interface that can include the user input device 104. The user input device can include a keypad with a first group of keys, such as keypad 57 shown in FIG. 5. The keys 57 can be alphanumeric keys and can be used for example to enter a telephone number, write a text message (SMS), or write a name (associated with the phone number). Each of the twelve alphanumeric keys 57 shown in FIG. 5 can be associated with a alphanumeric such as "A-Z" or "0-9", or a symbol, such as "#" or "*", respectively. In alternate embodiments, any suitable number of keys can be used, such as for example a QUERTY keyboard, modified for use in a mobile device. In an alpha mode, each key 57 can be associated with a number of letters and special signs used in the text editing.

The user interface 102 of the device 100 of FIG. 1 can also include a second group of keys, such as keys 58 of FIG. 5 that can include for example, soft keys 59a, 59b, call handling keys 56a, 56b, and a multi-function/scroll key 54. The call handling keys 56a and 56b can comprise a call key (on hook) and an end call (off hook). The keys 58 can also include a 5-way navigation key 54 (up, down, left, right and center: select/activate). The function of the soft keys 59a and 59b generally depends on the state of the device, and navigation in the menus of applications of the device can be performed using the navigation key 54. In one embodiment, the current function of each of the soft keys 59a and 59b can be shown in separate fields or soft labels in respective dedicated areas 53a and 53b of the display 52. These areas 53a and 53b can generally be positioned in areas just above the soft keys 59a and 59b. The two call handling keys 56a and 56b are used for establishing a call or a conference call, terminating a call or rejecting an incoming call. In alternate embodiment, any suitable or key arrangement and function type can make up the user interface of the device 50, and a variety of different arrangements and functionalities of keys of the user interface can be utilized.

In one embodiment, the navigation key 54 can comprise a four- or five-way key which can be used for cursor movement, scrolling and selecting (five-way key) and is generally placed centrally on the front surface of the phone between the display 52 and the group of alphanumeric keys 57. In alternate embodiments, the navigation key 54 can be placed in any suitable location on user interface of the device 50.

Referring to FIG. 1, the display 114 of the device 100 can comprise any suitable display, such as for example, a touch screen display or graphical user interface. In one embodiment, the display 114 can be integral to the device 100. In alternate embodiments the display may be a peripheral display connected or coupled to the device 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of an LCD with optional back lighting, such as a TFT matrix capable of displaying color images. A touch screen may be used instead of a conventional LCD display.

The device 100 may also include other suitable features such as, for example, a camera, loudspeaker, connectivity port or tactile feedback features.

Figure 6:
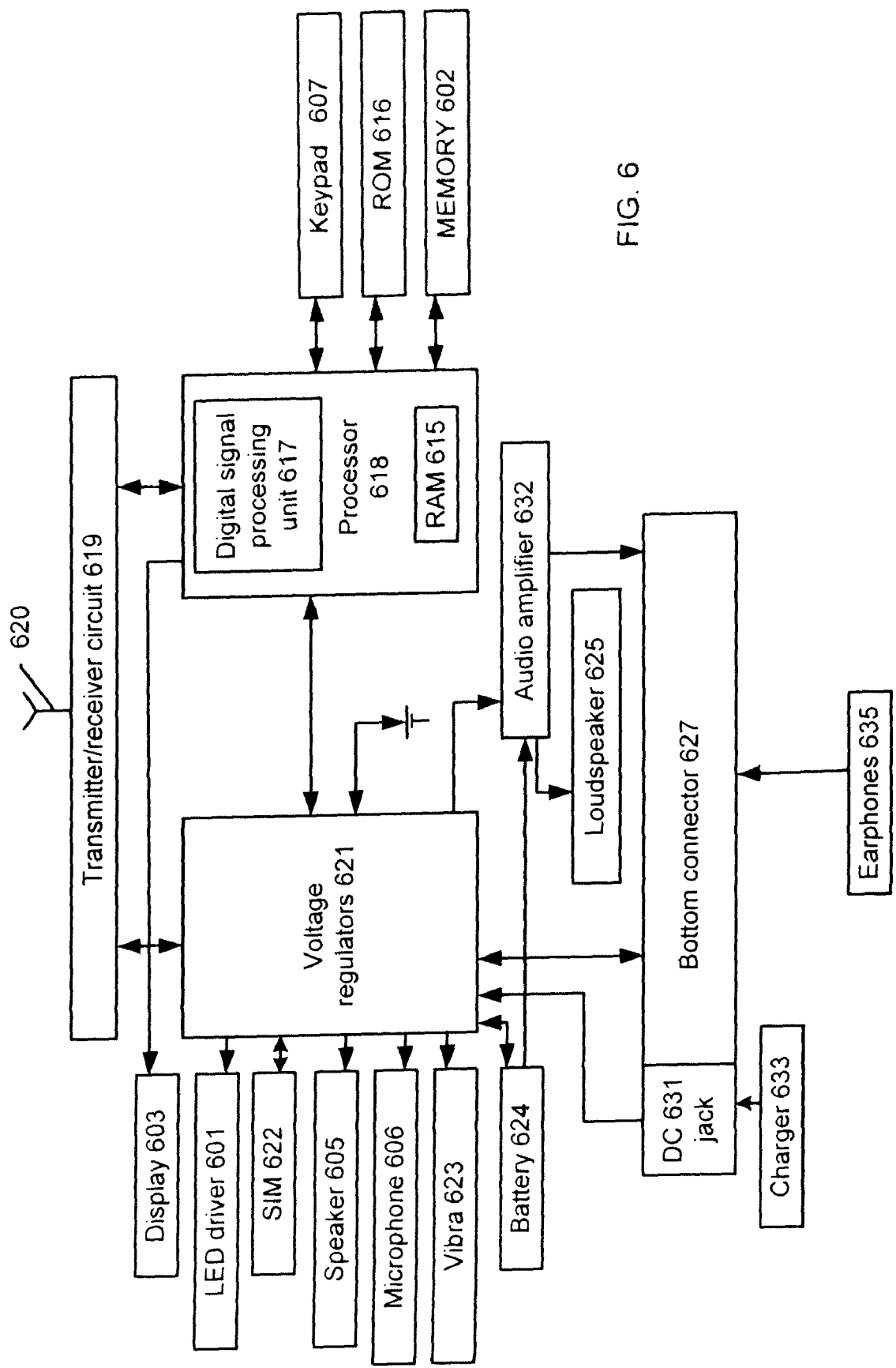
FIG. 6 is a block diagram illustrating the general architecture of the exemplary mobile device of FIG. 1.

FIG. 6 illustrates in block diagram form one embodiment of a general architecture of the mobile device 50. The mobile communications device 50 may have a processor 618 connected to the display 603 for processing user inputs and displaying information on the display 603. The processor 618 controls the operation of the device and can have an integrated digital signal processor 617 and an integrated RAM 615. The processor 618 controls the communication with a cellular network via a transmitter/receiver circuit 619 and an internal antenna 620. A microphone 606 is coupled to the processor 618 via voltage regulators 621 transforms the user's speech into analog signals. The analog signals formed are A/D converted in an A/D converter (not shown) before the speech is encoded in the DSP 617 that is included in the processor 618. The encoded speech signal is transferred to the processor 618, which e.g. supports the GSM terminal software. The digital signal-processing unit 617 speech-decodes the signal, which is transferred from the processor 618 to the speaker 5 via a D/A converter (not shown).

A processor 618 can also include memory 602 for storing any suitable information and/or applications associated with the mobile communications device 50 such as phone book entries, calendar entries, etc.

The processor 618 also forms the interface for peripheral units of the device, such as for example, a (Flash) ROM memory 616, the graphical display 603, the keypad 607, a ringing tone selection unit 626, and an incoming call detection unit 628. In alternate embodiments, any suitable peripheral units for the device 50 can be included.

The software in the RAM 615 and/or in the flash ROM 616 contains instructions for the processor 618 to perform a plurality of different applications and functions.

Figure 7:
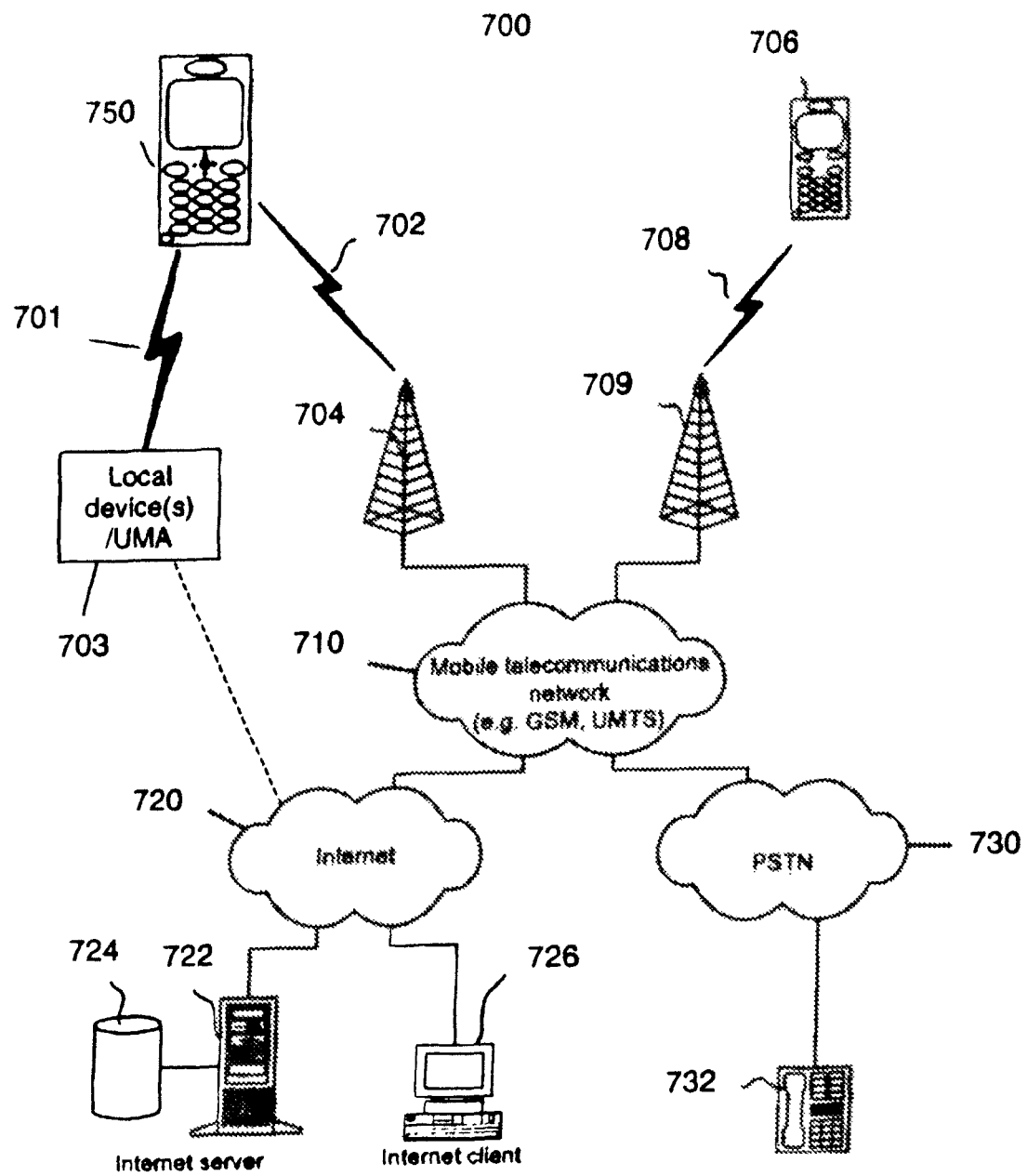
FIG. 7 illustrates one example of a schematic diagram of a network in which aspects of the disclosed embodiments may be practiced.

Referring to FIG. 7, one embodiment of a communication system in which the disclosed embodiments can be used is illustrated. In the communication system 100 of FIG. 7, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 750 and other devices, such as another mobile terminal 706, a stationary telephone 732, or an internet server 722. It is to be noted that for different embodiments of the mobile terminal 750 and in different situations, different ones of the telecommunications services referred to above may or may not be available. The aspects of the invention are not limited to any particular set of services in this respect.

The mobile terminals 750, 706 may be connected to a mobile telecommunications network 710 through radio frequency (RF) links 702, 708 via base stations 704, 709. The mobile telecommunications network 710 may be in compliance with any commercially available mobile telecommunications standard such as, for example, GSM, UMTS, D-AMPS, CDMA2000, FOMA and TD-SCDMA or other such suitable communication standard or protocol.

The mobile telecommunications network 710 may be operatively connected to a wide area network 720, which may be the Internet or a part thereof. An Internet server 722 has data storage 724 and can be connected to the wide area network 720, as is for example, an Internet client computer 726. The server 722 may host a www/wap server capable of serving www/wap content to the mobile terminal 700. In alternate embodiments, the server 722 can host any suitable transaction oriented protocol.

For example, a public switched telephone network (PSTN) 730 may be connected to the mobile telecommunications network 710 in a familiar manner. Various telephone terminals, including the stationary telephone 732, may be connected to the PSTN 730.

The mobile terminal 750 is also capable of communicating locally via a local link 701 to one or more local devices 703. The local link 701 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 703 can, for example, be various sensors that can communicate measurement values to the mobile terminal 700 over the local link 701. The above examples are not intended to be limiting, and any suitable type of link may be utilized. The local devices 703 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the Internet. The mobile terminal 750 may thus have multi-radio capability for connecting wirelessly using mobile communications network 710, WLAN or both. Communication with the mobile telecommunications network 710 may also be implemented using WiFi, WiMax, or any other suitable protocols, and such communication may utilize unlicensed portions of the radio spectrum (e.g. unlicensed mobile access (UMA)).

Figure 8:
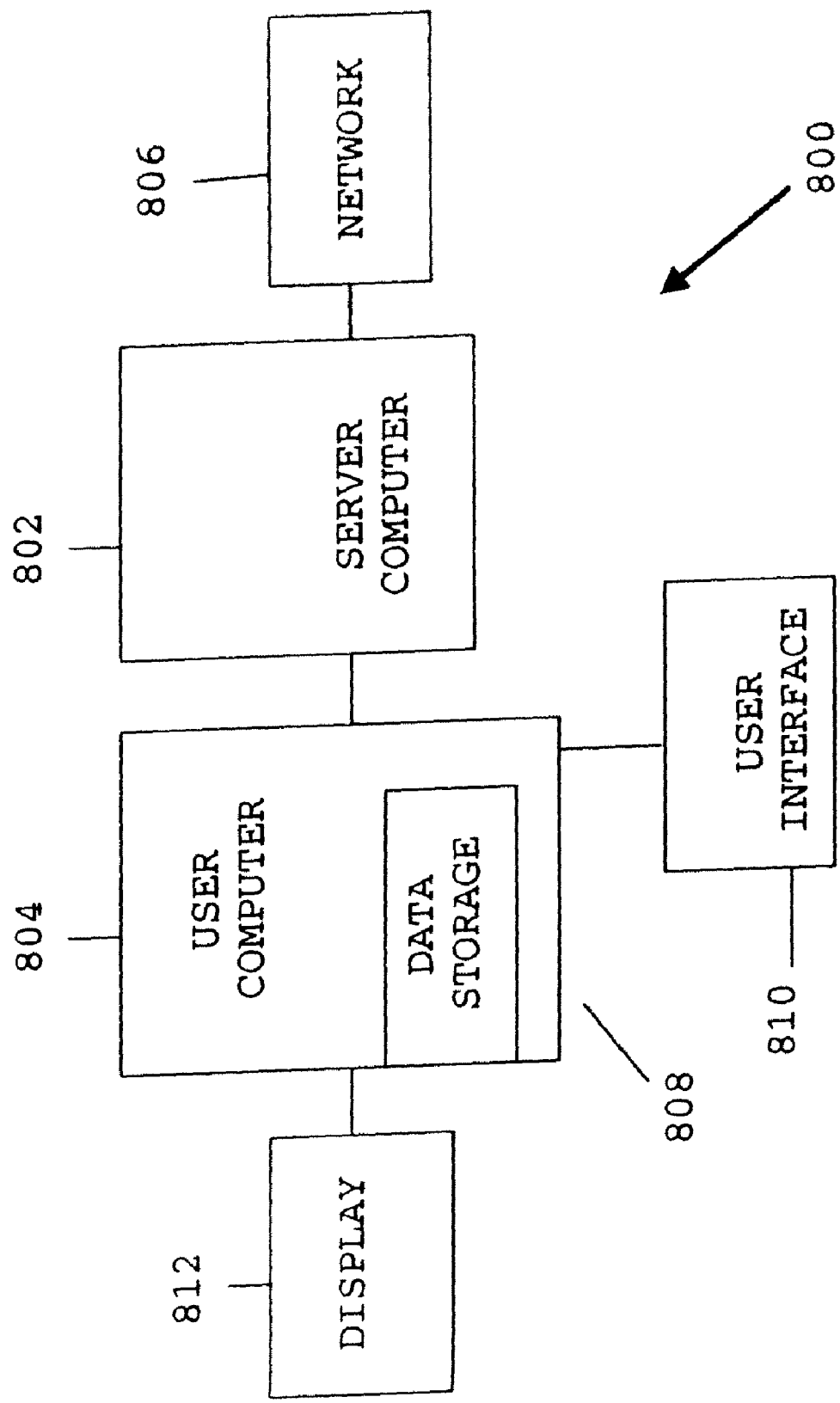
FIG. 8 illustrates a block diagram of an exemplary apparatus incorporating features that may be used to practice aspects of the disclosed embodiments.

The disclosed embodiments may also include software and computer programs incorporating the process steps and instructions described above that are executed in different computers. FIG. 8 is a block diagram of one embodiment of a typical apparatus 800 incorporating features that may be used to practice aspects of the invention. The apparatus 800 can include computer readable program code means for carrying out and executing the process steps described herein. As shown, a computer system 802 may be linked to another computer system 804, such that the computers 802 and 804 are capable of sending information to each other and receiving information from each other. In one embodiment, computer system 802 could include a server computer adapted to communicate with a network 806. Computer systems 802 and 804 can be linked together in any conventional manner including, for example, a modem, hard wire connection, or fiber optic link. Generally, information can be made available to both computer systems 802 and 804 using a communication protocol typically sent over a communication channel or through a dial-up connection on ISDN line. Computers 802 and 804 are generally adapted to utilize program storage devices embodying machine-readable program source code, which is adapted to cause the computers 802 and 804 to perform the method steps, disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 802 and 804 may also include a microprocessor for executing stored programs. Computer 802 may include a data storage device 808 on its program storage device for the storage of information and data. The computer program or software incorporating the processes and method steps incorporating aspects of the invention may be stored in one or more computers 802 and 804 on an otherwise conventional program storage device. In one embodiment, computers 802 and 804 may include a user interface 810, and a display interface 812 from which aspects of the invention can be accessed. The user interface 810 and the display interface 812 can be adapted to allow the input of queries and commands to the system, as well as present the results of the commands and queries.

The disclosed embodiments generally provide for a user to be able to control the fast-forwarding and rewind speeds for review multimedia files when such functions are enabled on a device. The speed with which such fast-forwarding and rewind is carried out is variable, and can depend in part on a duration of the file.

It should be understood that the foregoing description is only illustrative of the embodiments. Various alternatives and modifications can be devised by those skilled in the art without departing from the embodiments. Accordingly, the disclosed embodiments are intended to embrace all such alternatives, modifications and variances that fall within the scope of the appended claims.

What is claimed is:

1. A method comprising:
enabling a fast forwarding/rewind mode of a device to review a file;
changing a fast forwarding/rewind speed at a first rate upon activation of a first input device and with the first rate being based on a remaining duration of the file upon the activation; and
changing the fast forwarding/rewind speed to a second rate that is different from the first rate upon activation of the first input device at a subsequent time and with the second rate being based upon the remaining duration of the file at the subsequent time.

2. The method of claim 1 further comprising changing a direction of the fast forwarding/rewind mode upon activation of a second input device.

3. The method of claim 1 wherein the first rate is based on a percentage of a total duration of the file.

4. The method of claim 1 wherein the second rate is further based on a percentage of a remaining duration of the file.

5. The method of claim 1 further comprising the first rate being greater than the second rate.

6. The method of claim 1 further comprising the first rate being less than the second rate.

7. The method of claim 1 further comprising the fast forwarding mode also includes a rewind mode, wherein when the rewind mode is activated, the method further comprises increasing a rewind speed upon activation of the first input device at a rate that is based on a percentage of a duration of the file to be rewound and a speed adaptation function.

8. The method of claim 7 wherein changing to the second rate comprises changing the rewind speed to another rate upon activation of the first input device at the at least one subsequent time.

9. The method of claim 1 wherein activation of the first input device comprises a press and release to access the first rate, and a subsequent press and release to change to the second rate.

10. The method of claim 1 wherein the first input device comprises a touch screen device and activation of the first input device comprises contacting the touch screen with a contacting device.

11. The method of claim 1 wherein activation of the first input device comprises selecting a speed adaptation function stored in the device and setting a review demarcation point, and wherein the device automatically begins scrolling the file in accordance with the speed adaptation function and automatically activates the first input device at least one subsequent time at the review demarcation point.

12. The method of claim 1 wherein activation of the first input device at least one subsequent time comprises a stop review command, and wherein the device, in response to the stop review command also automatically re-adjusts a current review point in the file to a point just prior to the stop review command.

13. The method of claim 1 further comprising activation of the first input device to reach the first rate by pressing of the first input device until a desired rate is reached.

14. The method of claim 1 further comprising detecting an activation of the first input device, determining if the activation exceeds a pre-determined duration, and if the activation exceeds the pre-determined duration, enabling a change in rate of the fast forwarding/rewind speed.

15. The method of claim 14 further comprising, if the activation does not exceed the pre-determined duration, maintaining a current rate of the fast forwarding/rewind speed.

16. The method of claim 2 wherein the first and second input device comprise keys of a keypad device.

17. The method of claim 1 wherein changing a fast forwarding/rewind speed to a first rate comprises:
determining the duration of the file;
establishing an initial fast forwarding/rewind speed based on the duration of the file and a selected speed adaptation function.

18. The method of claim 17 further comprising:
detecting a request to change the fast-forwarding/rewind speed;
calculating a new fast-forward/rewind speed based on a remaining duration of the file and the selected speed adaptation function.

19. The method of claim 17 wherein the request to change the fast-forwarding/rewind speed is a function of a length of activation of the first input device.

20. The method of claim 17 wherein the request to change the fast-forwarding/rewind speed is a function of a number of activations of the first input device during a pre-determined period.

21. An apparatus comprising:
at least one processor; and
at least one memory including computer program code;
the at least one memory and the computer program code configured to, with the at least one processor, cause the apparatus at least to:
enable a fast-forwarding/rewind mode of the apparatus to review a file;
change a fast-forwarding/rewind speed to a first rate upon activation of an input device of the apparatus and with the first rate being based on a remaining duration of the file upon the activation; and
change the fast-forwarding/rewind speed to at least one other rate upon at least one subsequent activation of the input device and with the other rate being based on the remaining duration of the file upon the subsequent activation, the at least one other rate being different from the first rate.

22. The apparatus of claim 21 wherein the input device is a keypad.

23. The apparatus of claim 21 wherein the processor is further configured to change the fast-forwarding speed to the at least one other rate based upon a remaining duration of the file and a speed adaptation function.

24. The apparatus of claim 21, wherein the processor is further configured, upon each activation of the input device, to:
determine a current view point in the file;
determine an advance to point in the file;
apply a speed adaptation function to a duration between the current view point and the advance point to determine a rate of the fast-forwarding/rewind speed.

25. The apparatus of claim 21 wherein the input device comprises a mouse control device, the mouse control device including at least one key input device that is configured to provide control inputs to the apparatus including speed-up, speed-down, fast-forward and rewind control inputs.

26. The apparatus of claim 21 wherein the input device comprises a remote control device, the remote control device including at least one key input device that is configured to provide control inputs to the apparatus including speed-up, speed-down, fast-forward and rewind control inputs.

27. The apparatus of claim 21, wherein the apparatus is one of a media player or a mobile communications device.

28. A computer program product comprising:
a non-transitory computer useable medium having computer readable code embodied therein for causing a computer to execute a set of instructions in a device to enable an adaptive fast forwarding/rewind mode of a device, the computer readable code in the computer program product comprising:
computer readable program code for causing a computer to receive a request to change a speed of a fast forwarding/rewind mode;
computer readable program code for causing a computer to determine a remaining duration of a file to be reviewed using the fast forwarding/rewind mode;
computer readable program code for causing a computer to apply a speed adaptation function to the remaining duration of the file; and
computer readable program code for causing a computer to determine a speed to be applied to the fast-forwarding/rewind mode based on the remaining duration of the file and the speed adaptation function.

29. The computer program product of claim 28 further comprising:
computer readable program code means for causing a computer to display an indicator of a current view point of the file and a selected speed adaptation function.

30. The computer program product of claim 28 further comprising:
computer readable program code means for causing a computer to detect a speed control request input;
computer readable program code means for causing a computer to determine if the speed control request input comprises a sequences of inputs or a single input of a pre-determined duration; and
computer readable program code means for causing a computer to associate a speed adaptation function corresponding to the speed control request to determine a new fast-forwarding/rewind speed.

31. A user interface for a device comprising:
a control for enabling a fast forwarding/rewind mode to review a file; and
a first input device configured to change a fast forwarding/rewind speed at a first rate upon a first activation and with the first rate being based on a remaining duration of the file upon the first activation and further configured to, upon at least one subsequent activation, change the fast forwarding/rewind speed at a second rate that is different from the first rate and with the second rate being based on the remaining duration of the file upon the subsequent activation.

32. The user interface of claim 31 further comprising:
an area configured to allow a user to select a speed adaptation function for changing the fast forwarding/rewind speed.

* * * * *